INVENTORS:
Paul J. Crane
Glenn A. Reese
By Smyth, Roston & Pavitt
Attorneys

INVENTORS:
Paul J. Crane
Glenn A. Reese
By Smyth, Roston & Pavitt
Attorneys

INVENTORS:
Paul J. Crane
Glenn A. Reese

By Smyth, Roston & Pavitt
Attorneys

INVENTORS:
Paul J. Crane
Clenn A. Reese

By Smyth, Roston & Pavitt
Attorneys

United States Patent Office 3,449,522

Patented June 10, 1969

3,449,522
ACOUSTICAL COUPLER

Paul J. Crane, Torrance, and Glenn A. Reese, San Pedro, Calif., assignors to The Magnavox Company, Torrance, Calif., a corporation of Delaware Filed July 21, 1965, Ser. No. 473,676
Int. Cl. H04m *1/00*
U.S. Cl. 179—1 14 Claims

ABSTRACT OF THE DISCLOSURE

For coupling a telephone handset to a facsimile system, an acoustical coupler is made variously adjustable and sealable with the handset.

This invention relates in general to the principles of coupling electrical signals into telephone handsets and the like for the purpose of transmitting them from their source to locations remote therefrom by using standard telephone transmission facilities. More particularly, in order to illustrate these principles in connection with a specific application, the invention provides improvements making it possible to send and receive facsimile signals of documents between facsimile transceiver sets through any standard telephone handset rather than requiring special equipment for placing the facsimile signals onto the telephone transmission lines and receiving the facsimile signals from the telephone transmission lines. The acoustical coupler of the instant invention could also be used in digital printing systems or to transmit video or FM signals.

In the present practice of facsimile transmission using standard commercial telephone lines, the facsimile signal from the transmitter must be coupled into the commercial telephone circuits by a special sending device electrically connected into special leased lines. Likewise, removal of facsimile signals at their destination can be accomplished only by an electrical signal receiver wired into the circuit in place of the handset on that particular line. Thus, present facsimile transceivers are difficult to install and are inflexible in their operating potentialities, being limited practically to exchanging copies through a special line between only two specific locations.

The object of the acoustical coupler of the present invention is to free facsimile transceivers from their special installations and to permit the sending and receiving of and between any and all ordinary telephones, merely by dialing the receiving location from the sending location and acoustically coupling the facsimile signals through the handset transducers at each end. Accordingly, the acoustical coupler must be adjustable to every type of handset normally used and must pass acoustical signals back and forth between handset and transceiver with minimum loss of strength and also minimum introduction of noise due to outside acoustical signals or vibration of the coupler. Also, it must position the handset accurately, with minimum care by the user and regardless of tension from the handset coiled cord. The acoustical coupler of the present invention is particularly adapted to be used with transmitting and receiving systems as described in application Ser. No. 176,248 filed in the names of Glenn A. Reese and Paul J. Crane, and application Ser. No. 458,954 filed on behalf of Rex J. Crookshanks and Glenn A. Reese.

In the solution of the above-discussed and other problems, the invention provides first a cradle for holding telephone handsets that is adaptable to variations in length, curvature and microphone size of normally used handsets. The cradle has two electrical-acoustical transducers, each borne on a mounting plate. The coupler of the instant invention has these mounting plates movable to help ensure that the electrical-acoustical transducers are able to form an acoustical seal with the telephone handset once it is properly placed in the cradle. In a typical embodiment, one or more of the mounting plates is made slidable to adjust for varying lengths of the sets, and one or more of the mounting plates is made variable in angle to adjust for curvature of the handsets. The cradle also features guiding and holding devices so that the handset can easily be dropped into the proper position for acoustical coupling to take place.

As another feature of the invention, each electrical-acoustical transducer rests on its plate mounted on a rubber or other compliant mount which allows the transducer to become disposed, under pressure from the handset, into a plane parallel with the microphone faces of the handset. Since all modern standard telephone handsets have circular microphone faces, a rubber washer backed by a face plate on the output face of the electrical-acoustical transducer and presenting an essentially plane surface provides a seal against acoustical signal leakage and room noise interference for a wide range of microphone face diameters. Moreover, since the telephone contacts the washer at the same position that the washer (due to the pressure of the telephone) is pressed against the face plate, an excellent seal is created and virtually all spurious air movement in the area between transducers is stopped, resulting in the rejection of substantially all room noise and the achievement of flatter frequency response and phase shift characteristics than was heretofore possible in prior attempts to perform acoustical coupling. Also, this type of seal maximizes the intimacy of contact between handset and transducer. As another feature of the invention, to insulate the acoustical coupler against spurious vibration, the telephone crade is mounted on a foam rubber or other vibration damping material.

Broadly speaking, therefore, the achievements of the invention include the combination for use with a facsimile transceiver of a first electrical-acoustical transducer for converting electrical fascimile signals from the transceiver into acoustical signals, a second electrical acoustical transducer for converting acoustical signals into electrical facsimile signals for the transceiver, means for supporting the first and second electrical-acoustical transducers in spaced relationship to each other, means operatively coupled to at least one of the first and second electrical transducers and to the support means for adjusting the distance between the first and second electrical transducers in accordance with the distance between the transmitting and receiving microphones of the telephone handset, means operatively coupled to at least a particular one of the first and second electrical-acoustical transducers for providing a pivotal movement of the particular transducer relative to the other transducer and to the transmitting and receiving microphones of the telephone handset to compensate for variations in the angle between the transmitting and receiving microphones, first resilient means encompassing the first electrical-acoustical transducer and extending outwardly through a particular distance from the transducer to receive the transmitting microphone in an acoustically sealed relationship with the first electrical-acoustical transducer regardless of the external dimensions of the first electrical-acoustical transducer, and second resilient means encompassing the second electrical-acoustical transducer and extending outwardly through a particular distance from the transducer to receive the receiving microphone in an acoustically sealed relationship with the second electrical-acoustical transducer regardless of the external dimensions of the second electrical-transducer.

Other objects and features of applicants' invention and a better understanding thereof may be had by referring to the following description and claims taken in conjunction with the accompanying drawings, in which:

Figure 1:
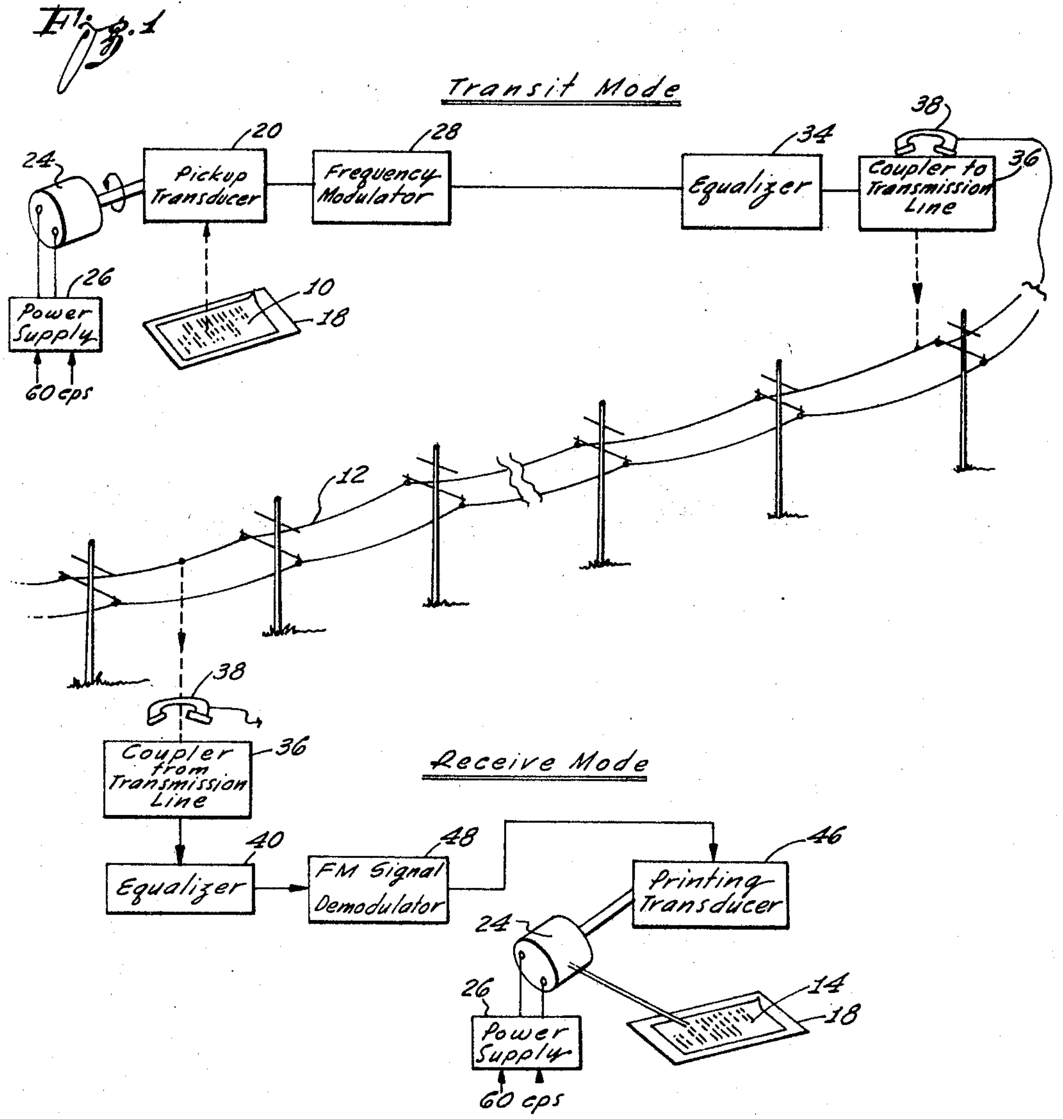
FIGURE 1 is a block diagram of a facsimile system in which the acoustical coupler of the invention might be used.

Referring to FIGURE 1, the facsimile transmission system shown in block diagram therein has the function of transferring the contents of an original document 10 over long distances through standard telephone transmission circuitry 12 to produce a copy 14 of the original document 10. In the transmit mode of a facsimile transceiver, the original document is held by a platen 18 in position to be scanned by a pickup transducer 20. A motor 24 is mechanically connected to both the platen 18 and the pickup transducer 20 to move the two in such a manner that the scanning operation is accomplished. A power supply 26 supplies the electrical drive signals which actuate the motor 24. In its preferred form, the power supply 26 simply derives an AC motor drive signal from the 60 cycle-per-second AC line supply. In such a system, the motor 24 is of the synchronous variety.

The pickup transducer 20 produces a base-band electrical signal representative of the contents of the original document 10; this signal will hereinafter be referred to as the facsimile signal. In order to make it possible to transmit the facsimile signal over the commercial telephone lines 12, the signal is frequency modulated by suitable circuitry represented at 28 to produce an FM signal suitable for telephone line transmission. The FM signal emerging from the frequency modulator 28 is fed into an equalizer 34 which serves to precompensate the signal for distortions characteristic of the telephone transmission lines 12. Following this precompensation at 34, the FM facsimile signal must be coupled into the standard commercial telephone transmission lines 12 by coupler system 36 which, according to the instant invention, performs the heretofore-impossible feat of coupling the FM facsimile signal through a standard commercial telephone handset, shown schematically at 38, rather than requiring special attachments and wiring for placing the transmitted signal on the commercial lines 12. The coupler 36 of the instant invention enables transceiver sets to be put into operation anywhere there is 60 cycle power supply and a standard telephone. In operation, the transmit mode operator simply dials the number of the receive mode station, converses with the receive mode operator as to the facsimiles about to be transmitted, and then, when both handsets 38 have been placed on their respective couplers 36, proceeds to transmit facsimile signals through the dialed circuit in the telephone transmission lines 12.

At the receive station, the facsimile signals from the transmission lines 12 are coupled through a handset 38 to a coupler 36 of the receive station transceiver which is operating in its receive mode. The FM facsimile signal is then processed by a receive mode equalizer 40 which augments the work of the transmit equalizer 34 in freeing the signal from transmission line distortion. The FM facsimile signal from the equalizer 40 is demodulated at 48 and processed to be fed into the printing transducer 46 in proper form for the copy production process.

The purpose of the acoustical coupler 36 is to transduce the electrical FM facsimile signal into an acoustical signal and thereafter to transfer the acoustical signal into a standard telephone handset 38 for transmission on the lines 12, or vice-versa in the receive-mode of the transceiver. The effectiveness of the acoustical coupler 36 is of considerable importance in the practice of facsimile transmission over commercial telephone lines. If the print-out copy 14 of the facsimile system is to be reasonably similar to the materials 10 originally read by the pickup transducer 20, or if data or other sorts besides facsimile signals is to be sufficiently reproducible, the acoustical coupler 36 should minimize the effects of the following disturbances: (1) room noise, (2) spurious vibration and (3) transmission line echo and distortion, and should have a flat frequency response curve and a flat phase response curve as frequency varies. The acoustical coupler 36 which is featured in the instant invention is two-way in its capabilities: it can either transduce and couple electrical signals into a telephone handset 38 or receive acoustical signals from the telephone handset 38 and convert them back into electrical signals for use in the print-out mode of the facsimile transceiver system shown in FIGURE 1.

Figures 2, 3, 4, 5, 6:
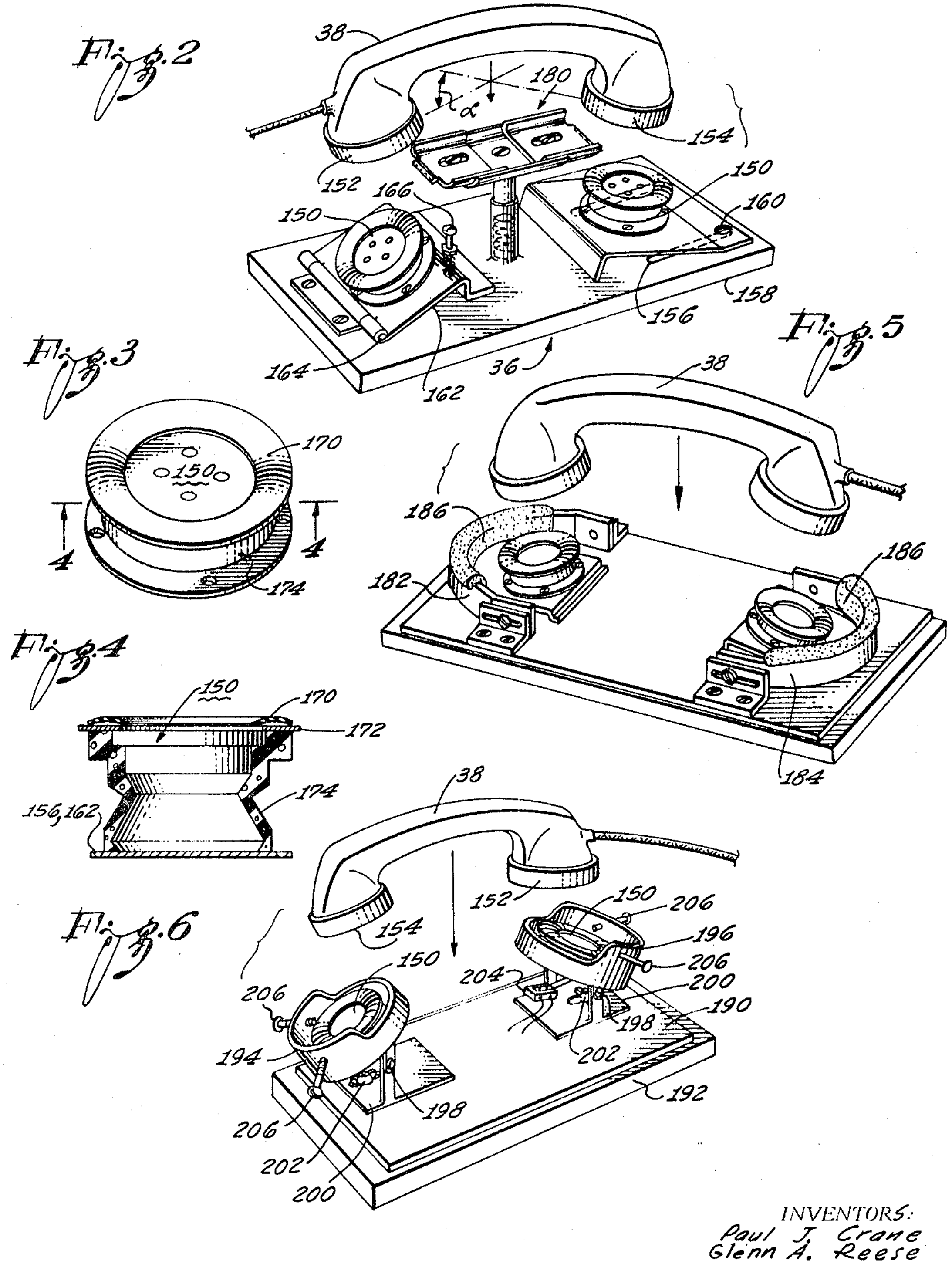
FIGURE 2 is a perspective view of one embodiment of an acoustical coupler according to the invention.
FIGURE 3 is a perspective view in detail of an electrical-acoustical transducer of the sort used in the acoustical coupler of FIGURE 2.
FIGURE 4 is a detailed side elevation with a partial cutaway along lines 3—3 of the electrical-acoustical transducer of the acoustical coupler of FIGURE 3.
FIGURE 5 is a perspective view of a second acoustical coupler according to the principles of the invention.
FIGURE 6 is a perspective view of a third acoustical coupler according to the invention.

Referring to FIGURE 2, at the heart of the acoustical coupler 36 are electrical-acoustical transducers 150, which exchange acoustical signals with a standard commercial telephone handset 38. These transducers may be similar to the transducers in the handset itself and are adapted to give flat frequency response and minimal phase shift in the frequency band of the facsimile transceiver FM transmission system. An electromagnetic diaphragm design such as the Automatic D–51024–A has been found most satisfactory.

Individual telephone handsets vary somewhat in the following particulars regarding their microphones and speakers (i.e., acoustical-electrical transducers) 152 and 154, respectively: (1) the distance between the centers of the circular faces of the microphone 152 and speaker 154, (2) the difference in the angle $\alpha$ between the planes of the faces of the microphone 152 and speaker 154 (between 11° and 19°, usually), and (3) differences in diameter of the circular faces of the transducers 152 and 154 are met by making a first mounting plate 156 of one of the transducers 150 slidable in a base plate 158 of the acoustical coupler 36. A lock screw 160 may be used to hold the slidable plate 156 in place once it has been adjusted to accommodate a specific handset 38. The difference in the angle $\alpha$ between the planes of the microphone 152 and speaker 154 is compensated by varying the tilt of a second mounting plate 162 of one of the transducers 150. This may be accomplished by hinging the mounting plate 162 to the base plate 158 as at 164 and turning an elevating screw 166 to raise the unhinged end of the mounting plate 162.

Referring to FIGURES 3 and 4, the varying diameters of the circular faces of the telephone handset microphones 152 and 154 are accommodated by surrounding each transducer face 150 with a compliant rubber washer 170, preferably of concave shape and having a plane backup washer 172. The washer 172 is plane and rigid so as to provide a support for the washer 170. Thus, when the handset transducer faces rest on the washer 170 said washer is pressed down againt the washer 172, forming an acoustical seal that is essentially hermetical, so that no spurious air movement or outside voice intrusion can distort the acoustical signals being coupled. In order to make fine adjustments to variation in the angle α between the microphones 152 and 154, the transducer 150 may be borne on its mounting plate 156 or 162 by a sponge cylinder 174. (In the alternative, a bellows or some other non-sponge but resilient material or arrangement could be substituted for the cylinder 174.) Such a resilient mounting has the added advantages of correcting tiny errors of alignment with the handset and of providing additional insulation of the transducer 150 from vibration disturbances coming through the base 158 of the acoustical coupler.

In order to hold the handset microphones 152 and 154 in an exact relationship with the transducer 150, an adjustable cradle as shown at 180 in FIGURE 2 is used or U-shaped endpiece (horseshoes) 182 and 184 as shown in FIGURE 5 are used to hold the handset 38 in proper orientation. The cradle 180 is made adjustable in length, and similarly each of the horseshoes 182 and 184 is made slidable in the lateral direction to accommodate variable outer dimensions of the handset 38. Those areas of the cradle 180 or of the horseshoes 182 and 184 which come into contact with the handset 38 are made vertical so that nothing will impede gravity from causing the easy sliding of the handset 38 into its proper position over the transducer 150. To further facilitate easy sliding and also for the additional reason that such contact surfaces should not gouge or mar the handset 38, felt 186 or some other slidable material should be fitted to the contact surfaces.

Referring to FIGURE 6, the acoustical coupler shown there has its metal base 190 resting on an insulation pad 192 of foam rubber or some other vibration insulating material in order to minimize the effect of spurious vibration on the acoustical coupling signals between the handset microphones 152 and 154 and the electrical-acoustical transducers 150. The transducers 150 may be mounted as shown in FIGURES 3 and 4 upon the seats of two chairs 194 and 196 (made up of electrical-acoustical mounting platforms and "backs" for guiding telephone handsets into position), which are gimbaled at 198 to slides 200 having lock screws 202. A sensing switch 204 associated with one of the gimbaled chairs (here shown as the chair 196) is activated by the rotation of the chair 196 when the handset is placed therein, thus providing a signal usable for indicator lights, ready signals for other transceivers and the like to show whether the handset is present or not in the acoustical coupler 36 and to activate the transmitting and receiving systems shown in FIGURES 1 and 2. It can be seen that the acoustical coupler of FIGURE 6 adjusts to differences between the centers of the circular faces of the microphones 152 and 154 by movement of the slides 200 and accommodates to variations in the angle α between the planes of the faces of the microphones 152 and 154 by free rotation on the gimbals 198 of the chairs 194 and 196. Because the outer dimensions of the handset 38 may vary somewhat as well, it may be helpful to use adjusting screws 206 through the backs of the chairs 194 and 196 in order to provide an accurate positioning for the handset, once the slides 200 are positioned to accommodate properly the microphones 152 and 154.

Figure 7:
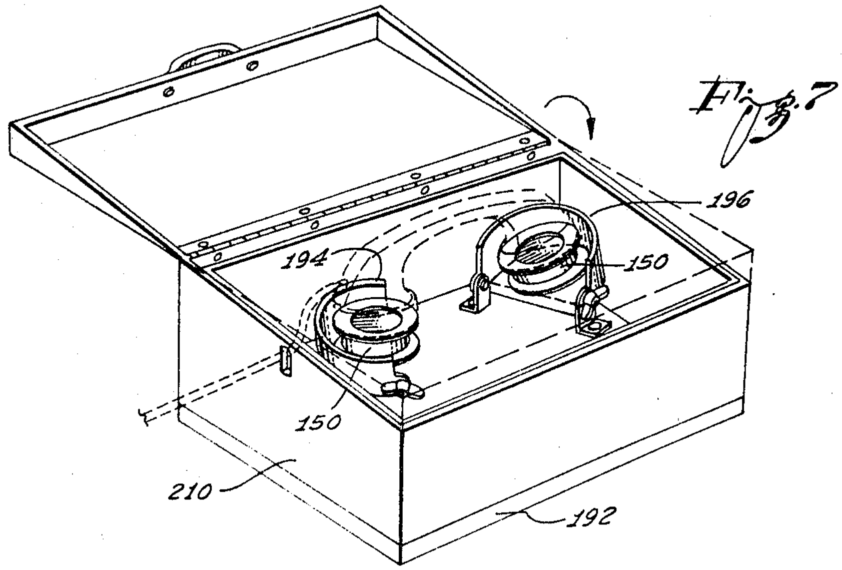
FIGURE 7 is a perspective view of an enclosed acoustical coupler according to another feature of the invention.

Referring to FIGURE 7, the acoustical coupler shown therein features a sealed box 210 (or, broadly, any closed container) for minimizing room noise interference with acoustical coupling and can use the pad 192 to absorb mounting vibration. The chairs 194 and 196 used in the box 210 are shown adjustably clamped to the box rather than being gimbaled as shown in FIGURE 6. Moreover, the chairs 194 and 196 are mounted directly opposed as shown in FIGURE 6, but rather are mounted both with their adjustable rotation axes at some angle, as for example 120° or 135°, rather than being parallel, and also with the faces of their transducers tilted forward and toward each other, since the telephone handset 38 will usually be dropped in from the front.

Figure 8:
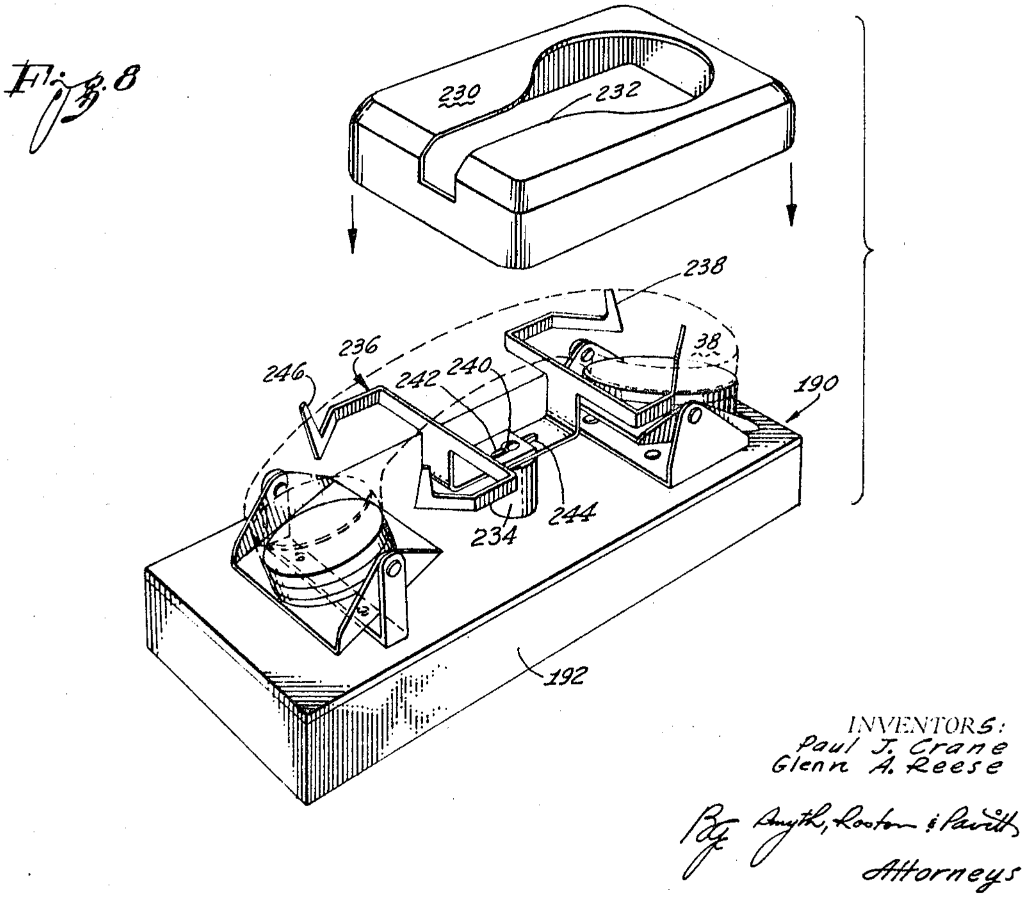
FIGURE 8 is a perspective view of a fourth acoustical coupler according to the invention.

Referring to FIGURES 8, 9, 10 and 11, the embodiments of the principles of the instant invention shown there are especially well adapted for use in installations that are open to view or in public places and are otherwise industrially designed to make a more readily marketable product than the embodiments heretofore discussed. Therefore, the coupler of FIGURE 8, in addition to using the pad 192 on which a base plate 190 is mounted and the slidable gimbaled transducer mounting units 194 and 196, all as discussed in connection with FIGURE 6, the entirely new element of a cover 230 having a slot or cavity 232 to admit the handset 38 is introduced to prevent damage to the mechanism of the coupler and also to prevent the sharp edges of the coupler mechanism from causing harm. The cover 230 is preferably removable and encloses as much of the mechanism as is possible. In order to perform the positioning function on the handset 38, the specific embodiment of FIGURE 8 shows a center post 234 mounted on the plate 190 and two handset positioners 236 and 238 mounted slidably on the center post 234. Preferably, a screw 240 which can be loosened and tightened down when the positioners 236 and 238 are in proper adjustment holds the positioners to the center post 234 by passing through slots 242 and 244 on the positioners 236 and 238, respectively. Each of the positioners 236, 238 contacts the handset 38 through two surfaces 246 which, as discussed above, should be both substantially vertical to allow the handset to slide into place when casually dropped into the acoustical coupler and of some material (for example, pressed rubber) which has a low coefficient of friction to permit easy sliding and which will not mar the telephone handset 38.

Figure 9:
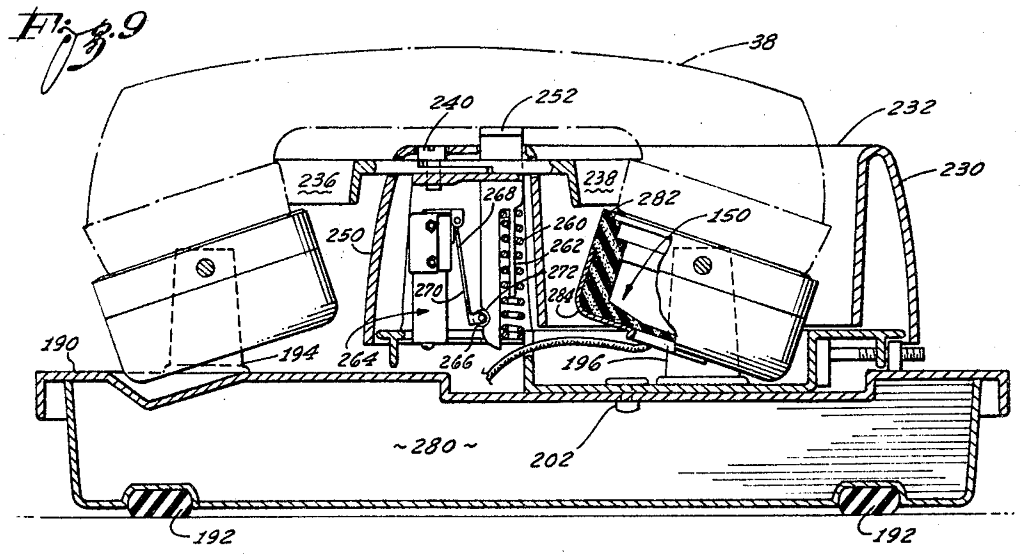
FIGURE 9 is a side elevation of the acoustical coupler of FIGURE 8, but with slight changes to illustrate other useful ways of practicing the invention.
Figure 10:
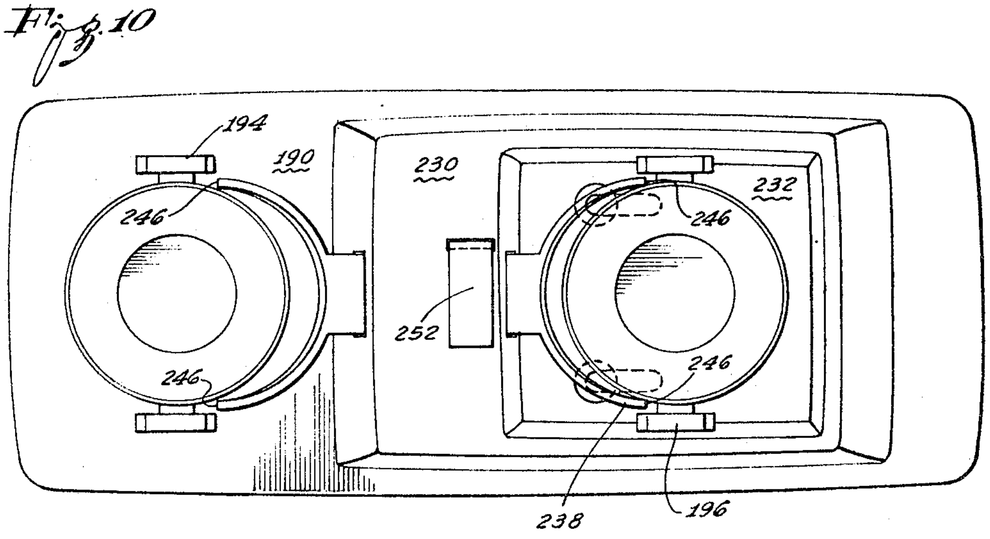
FIGURE 10 is a plan elevation of the acoustical coupler of FIGURE 9.
Figure 11:
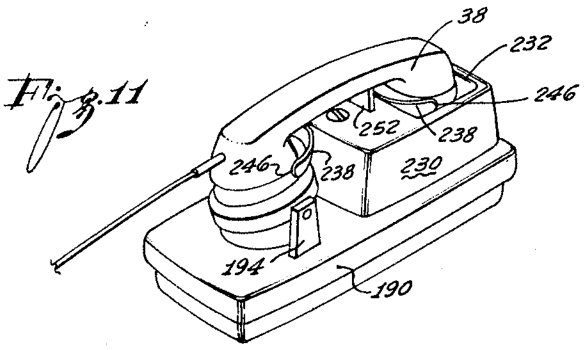
FIGURE 11 is a perspective view of the acoustical coupler of FIGURE 9.

In the specific embodiment of the principles of applicants' invention shown in FIGURES 9–11, inclusive, the center post 234 of FIGURE 8 is replaced by a structure 250 to which the positioners 236 and 238 (here, slightly simplified in shape to promote ease in manufacturing) are held by the screw 240. In the embodiment of FIGURES 9–11, the telephone is supported on a single vertical member 252 made of pressed rubber or some other non-abrasive material. The vertical support member 252 is urged upward by a spring 260 mounted inside the housing 250 and held in place by a spring guide 262 on the support member 252. A microswitch 264 mounted within the housing 250 has a cam roller 266 mounted on a roller arm 268 urged against a cam surface 270 of the support member 252. When the presence of the handset 38 depresses the support member 252, the cam roller 266 rides a detent 272 in the cam surface 270, causing the microswitch 264 to switch to indicate the presence of the handset 38 on the coupler, similar to the function of the switch 204 of FIGURE 6.

It should be noted that the vibration-damping pad 192 discussed above appears in altered form as the legs 192 of FIGURE 9. The area 280 under the plate 190 then serves to house the coupler electronics. Also, the effect of the cylinder 174 of FIGURES 3 and 4 is obtained by mounting the transducers 150 in a similar resilient material 282 borne loosely in a metal can 284. It can be seen from the above discussion that the acoustical coupler of FIGURES 8 to 11 is as well adapted to accommodate varying sizes and shapes of handsets 38 as were the prior embodiments and yet, at the same time, has a large part of its mechanism covered to provide a more pleasing appearance and to prevent damage either to the coupler or to people or things coming in contact therewith.

In summary, applicants' acoustical coupler makes it possible for the first time to transmit signals between facsimile transceivers, digital printers, and other electronic communications systems using standard telephone handsets and other circuitry, with the result that facsimile transceiver and other communication sets are made inexpensive to install and practically portable in their potentialities. These advances in the facsimile transmission art have been achieved by providing an acoustical coupler with the features of being adaptable to all standard commercial telephone handsets, of providing the strongest practicable insulation from spurious sound and vibration, of eliminating all possible distoration components in the received signal, and of being easily moved from location to location. Thus, the noise and vibration normally found to be prohibitive when transmitting facsimile signals through handsets have been combated at every possible point to provide high-accuracy handset facsimile transmission.

Among the new features which are combined to carry out the purposes of applicants' invention, the inventive principles concerning mounting and hermetic sealing of the electrical-acoustical transducers 150 are of considerable importance. The purpose of the sealing means, of course, is to provide an almost air-tight space between the acoustical output face of the electrical-acoustical transducer and the microphone of a standard commercial telephone handset resting on the coupler. The more nearly air-tight the seal and the more perfect the acoustic seal, the less room noise will join into the facsimile acoustical signal passing between the handset and the electrical-acoustical coupler and the phase and frequency response will be more uniform with change in frequency. The flexible mount of the electrical-acoustical coupler serves two purposes: first, it permits small displacements or tiltings of the electrical-acoustical transducer in any axis when a telephone handset microphone is resting upon it so that a more perfect mating of handset to transducer is made and a more complete acoustical seal is achieved by the sealing device. Secondly, the material of which the flexible amount is made (e.g., foam rubber) will prevent a good deal of mounting vibration from reaching the electrical-acoustical transducer.

While the transducer mounting and sealing features of the invention are important to make acoustical coupling possible, applicant's acoustical coupler cradle principles contribute to the wide adaptability and easy use of handset-coupled facsimile transceivers; for the cradle holds the electrical-acoustical transducers with their associated sealing washers and a telephone handset of a wide variety of dimensions in such proximity to each other that the transducer sealing washers are able to form a good coupling with the handset microphones. The various specific embodiments of aplicants' cradle design principles also feature means for guiding the telephone handset into exactly the proper position for acoustical sealing even when it is dropped relatively casually onto the cradle and for holding it in its sealing position during operation of the coupler. Another important feature in cradle design is the insulation of the transducer mountings against vibration coming through the table-desk or whatever else the acoustical-coupler happens to be resting on; and still another useful feature of applicants' cradle is the association therewith of an electrical switch that is actuated by the presence of a telephone handset on the cradle. This electrical "present" signal from the cradle can be useful in producing a "ready" signal for actuating signal lights, signal tones or transmission-enabling circuitry in both the local transceiver system and in the other transceiver system with which it is in communication.

Although the invention has been described in its preferred form with a certain degree of particularity, it should be understood that the present disclosure of the preferred form has been made only by way of example and that numerous changes in the details of construction and in the combination and arrangements of parts may be resorted to without departing from the spirit and scope of the invention as hereinafter claimed. It should also be noted that in essence the prime use of this invention is the faithful transmission and recovery of audio acoustic information and may also be used for AM carrier, speech, etc. not being restricted to FM carrier use.

What is claimed is:

1. In combination for transmitting electrical signals to a location remote from the location of the original source of the signal using commercial telephone transmission facilities including first and second commercial telephone handsets, each having a microphone and a speaker, an acoustical coupler for coupling the electrical signals into and out of the transmitting and receiving handsets, comprising:

a base;

first and second gimbaled mounting platforms mounted slidably on the base;

backs mounted on the first and second mounting platforms and adapted to operate to guide a commercial telephone handset into a desired position on the platform;

an electrical-acoustical transducer mounted on the first mounting platform and electrically connected to convert electrical signals into acoustical signals for the microphone of the commercial telephone handset; and an acoustical-electrical transducer mounted on the second mounting platform and electrically connected to convert acoustical signals from the speaker of the commercial telephone handset into electrical signals.

2. An acoustical coupler for coupling facsimile signals between a facsimile transceiver and the microphones of a commercial telephone handset, comprising:

a closed container capable of being opened to admit the commercial telephone handset and adapted to provide substantial insulation against noise when closed;

a cradle base mounted inside the closed container;

a first mounting platform mounted rotatably to the cradle base;

a second mounting platform mounted slidably on the cradle base;

first and second electrical-acoustical transducers respectively mounted on the first and second mounting platforms and electrically connected to convert electrical facsimile signals from the transceiver into acoustical signals and acoustical signals into electrical signals for the transceiver;

sealing means mounted on the first and second electrical-acoustical transducers for forming an acoustical seal between the electrical-acoustical transducers and the microphones of the commercial telephone handset; and means associated with the mounting platforms for guiding and holding the commercial telephone handset to a particular position relative to the sealing means to seal the microphones of the commercial telephone handset to the first and second electrical-acoustical transducers.

3. An acoustical coupler for coupling facsimile signals between facsimile transceivers and commercial telephone handsets, comprising:

a base;

first and second gimbaled mounting platforms mounted on the base to provide for pivotal movements of the platforms relative to each other;

means operatively coupled to at least one of the platforms for varying the distance between the platforms;

guide means mounted on at least one of the first and second mounting platforms to guide one of the commerical telephone handsets into supporting position on the associated platform;

first and second electrical-acoustical transducers respectively mounted on the first and second mounting platforms and electrically connected to convert electrical facsimile signals from the transceiver into acoustical signals for the commercial telephone handset and acoustical signals into electrical signals for the handset; and first and second sealing means respectively associated with the first and second electrical-acoustical transducers to provide an acoustical seal between the first and second electrical-acoustical transducers and the commercial telephone handsets.

4. In combination for transmitting electrical signals to a location remote from the location of the original source of the signal using commercial telephone transmission facilities including first and second commercial telephone handsets, each having a microphone and a speaker, an acoustical coupler for coupling the electrical signals into and out of the transmitting and receiving handsets, comprising:

an electrical-acoustical transducer for converting electrical signals into acoustical signals;

first sealing means mounted on the electrical-acoustical transducer for forming an acoustical seal between the electrical-acoustical transducer and the microphone of the commercial telephone handset;

an acoustical-electrical transducer for converting acoustical signals from the speaker of the commercial telephone handset into electrical signals;

second sealing means mounted on the acoustical-electrical transducer for forming an acoustical seal between the acoustical-electrical transducer and the speaker of the commercial telephone handset;

adaptable mounting means on which the electrical-acoustical and acoustical-electrical transducers are mounted, said adaptable mounting means being constructed to vary the position of the electrical-acoustical and acoustical-electrical transducers relative to each other and the commercial telephone handset microphone and speaker in such manner that acoustical coupling occurs between the electrical-acoustical and acoustical-electrical transducers and the microphone and speaker of the commercial telephone handset; and adjustable holding means for holding a variety of commercial telephone handsets in proximity to the electrical-acoustical and acoustical-electrical transducers to facilitate acoustical signal coupling between each said transducer and the microphone and speaker of the commercial telephone handset.

5. In combination for transmitting electrical signals to a location remote from the location of the original source of the signal using commercial telephone transmission facilities including first and second commercial telephone handsets, each having a microphone and a speaker, an acoustical coupler for coupling the electrical signals into and out of the transmitting and receiving handsets, comprising:

an electrical-acoustical transducer for converting electrical signals into acoustical signals;

first sealing means mounted on the electrical-acoustical transducer for forming an acoustical seal between the electrical-acoustical transducer and the microphone of the commercial telephone handset;

an acoustical-electrical transducer for converting acoustical signals from the commercial telephone handset into electrical signals;

second sealing means mounted on the acoustical-electrical transducer for forming an acoustical seal between the acoustical-electrical transducer and the speaker of the commercial telephone handset;

a closed container capable of being opened to admit a commercial telephone handset and constructed to provide substantial insulation against ambient acoustical noise when closed;

resilient support means; and holding means disposed on the resilient support means within the closed container and supporting the acoustical-electrical and electrical-acoustical transducers in adjustable relationship to each other to hold one of the first and second commercial telephone handsets in sealed relationship with the first and second sealing means respectively on the electrical-acoustical and acoustical-electrical transducers.

6. An acoustical coupler for coupling facsimile signals between facsimile transceivers and commercial telephone handsets, comprising:

a base;

vibration-absorbing means operatively associated with the base;

first and second gimbaled mounting platforms mounted slidably relative to each other on the base;

backs mounted on the first and second mounting platforms to guide the commercial telephone handset into a desired position on the platforms;

first and second electrical-acoustical transducers respectively mounted on the first and second mounting platforms and electrically connected to convert electrical facsimile signals from the transceiver into acoustical signals and acoustical signals into electrical signals for the transceiver;

sealing means respectively mounted on the first and second electrical-acoustical transducers for forming an acoustical seal between the electrical-acoustical transducers and the commercial telephone handset;

adjustable positioning screws associated with the mounting platform backs to fine-adjust the final resting position of the commercial telephone handsets; and adjustable holding means associated with the first and second mounting platforms to prevent the mounting platforms from sliding on the base.

7. An acoustical coupler for coupling facsimile signals between facsimile transceivers and commercial telephone handsets, comprising:

a base;

a first mounting platform hinged at one end to the base and having a free, unhinged end opposite the hinged end on the base;

a second mounting platform mounted slidably on the base;

first and second electrical-acoustical transducers mounted on the first and second mounting platforms and electrically connected to convert electrical facsimile signals from the transceiver into acoustical signals and acoustical signals into electrical signals for the transceiver;

sealing means mounted on the first and second electrical-acoustical transducers for forming an acoussical seal between the electrical-acoustical transducers and the commercial telephone handset;

adjustable tilting means associated with the first mounting platform and adapted to rotate the free end of the first mounting platform relative to the hinged end;

adjustable holding means associated with the second mounting platform and adapted to hold the second mounting platform in a fixed position;

a cradle bearing on the base;

a cradle column mounted in the cradle bearing; and a cradle shaped to provide support for the commercial telephone handset mounted on the cradle column, the length of the cradle being made adjustably variable to permit accommodation of various-shaped commercial telephone handsets.

8. An acoustical coupler for coupling facsimile signals between facsimile transceivers and commercial telephone handsets, comprising:

a first electrical-acoustical transducer for converting electrical facsimile signals from the transceiver into acoustical signals;

a second electrical-acoustical transducer for converting acoustical signals into electrical facsimile signals for the transceiver;

means for supporting the first and second electrical-acoustical transducers in spaced relationship to each other;

means operatively coupled to at least one of the first and second electrical transducers and to the support means for adjusting the distance between the first and second electrical transducers;

means operatively coupled to at least a particular one of the first and second electrical-acoustical transducers for providing a pivotal movement of the particular transducer relative to the other transducer and to the telephone handset to compensate for variations in the configuration of the telephone handset;

first resilient means encompassing the first electrical-acoustical transducer and extending outwardly through a particular distance from the transducer to receive the telephone handset in an acoustically sealed relationship with the first electrical-acoustical transducer regardless of the external dimensions of the first electrical-acoustical transducer; and second resilient means encompassing the second electrical-acoustical transducer and extending outwardly through a particular distance from the transducer to receive the telephone handset in an acoustically sealed relationship with the second electrical-acoustical transducer regardless of the external dimensions of the second electrical-acoustical transducer.

9. The acoustical coupler set forth in claim 8 wherein switching means are supported by the support means and are provided with inoperative and operative states and are responsive to the disposition of the telephone handset on the first and second electrical-acoustical transducers for becoming operative to provide for a transmission of information between the transducers and the handset.

10. An acoustical coupler for coupling facsimile signals between facsimile transceivers and commercial telephone handsets, comprising:

a first electrical-acoustical transducer for converting electrical facsimile signals from the transceiver into acoustical signals;

a second electrical-acoustical transducer for converting acoustical signals into electrical facsimile signals for the transceiver;

means for supporting the first and second electrical-acoustical transducers in spaced relationship to each other;

means operatively coupled to at least one of the first and second electrical-acoustical transducers for adjusting the distance between the first and second electrical-acoustical transducers;

means operatively coupled to at least one of the first and second electrical acoustical transducers for providing adjustments in the position of one of the first and second electrical-acoustical transducers relative to the other one of the electrical-acoustical transducers to provide a disposition of commercial telephone handset in contiguous relationship to the electrical-acoustical transducers;

means supported by the supporting means for providing a support for the telephone handset to dispose the telephone handset in contiguous relationship to the first and second electrical-acoustical transducers;

first resilient means encompassing the first electrical-acoustical transducer to seal the telephone handset to the first electrical-acoustical transducer and having dimensions to compensate for any variations in the external dimensions of the telephone handset; and second resilient means encompassing the second electrical-acoustical transducer to seal the telephone handset to the second electrical-acoustical transducer and having dimensions to compensate for any variations in the external dimensions of the telephone handset.

11. In the acoustical coupler set forth in claim 10, the support means for the telephone handset being adjustable in length in accordance with the distance between the transmitting and receiving microphones of the telephone handset.

12. In the acoustical coupler set forth in claim 10, a first flexible washer surrounding the first electrical-acoustical transducer;

a first rigid backing washer mounted beneath the first flexible washer;

a second flexible washer surrounding the second electrical-acoustical transducer; and a second rigid backing washer mounted beneath the second flexible washer.

13. In the acoustical coupler set forth in claim 10, first flexible means surrounding the first electrical-acoustical transducer and adapted to contact the edges of the output face of the handset transmitting microphone;

first backing means adapted to provide support for the edges of the output face of the handset transmitting microphone underneath the first flexible means;

second flexible means surrounding the second electrical-acoustical transducer and adapted to contact the edges of the output face of the handset receiving microphone; and second backing means adapted to provide support for the edges of the output face of the handset receiving microphone underneath the second flexible means.

14. An acoustical coupler for coupling facsimile signals between facsimile transceivers and commercial telephone handsets, comprising:

a base;

a first mounting platform mounted on the base;

a second mounting platform mounted on the base and adjustable in distance from and pivotable in relation to the first mounting platform;

an electrical-acoustical transceiver mounted on the first mounting platform for converting electrical facsimile signals from the transceiver into acoustical signals;

first sealing means mounted on the electrical-acoustical transducer for forming an acoustical seal between the electrical-acoustical transducer and the commercial telephone handset;

an acoustical-electrical transducer mounted on the second mounting platform for converting acoustical signals from the commercial telephone handset into electrical signals;

second sealing means mounted on the acoustical-electrical transducer for forming an acoustical seal between the acoustical-electrical transducer and the commercial telephone handset;

a cradle bearing on the base;

a cradle column mounted on the cradle bearing; and a cradle mounted on the cradle column to provide support for commercial telephone handsets, the length of the cradle being made adjustable to permit accommodation of various-shaped commercial telephone handsets.

References Cited

UNITED STATES PATENTS

| | | | |
|---|---|---|---|
| 1,503,590 | 8/1924 | Keen | 178—13 XR |
| 2,268,665 | 1/1942 | Loewe. | |
| 2,402,341 | 6/1946 | Patterson. | |
| 2,907,827 | 10/1959 | Voell. | |
| 3,092,688 | 6/1963 | Rector. | |

KATHLEEN H. CLAFFY, *Primary Examiner.*

ROBERT P. TAYLOR, *Assistant Examiner.*